United States Patent [19]
Oberth

[11] 4,038,114
[45] July 26, 1977

[54] CATALYST SYSTEM FOR POLYURETHANE PROPELLANT COMPOSITIONS

[75] Inventor: Adolf E. Oberth, Fair Oaks, Calif.

[73] Assignee: The United States of America as represented by the Secretary of the Air Force, Washington, D.C.

[21] Appl. No.: 716,305

[22] Filed: Aug. 20, 1976

[51] Int. Cl.² .............................................. C06B 45/10
[52] U.S. Cl. .................................. 149/19.4; 252/430; 260/77.5 AB
[58] Field of Search ...................... 149/19.4; 252/430; 260/2.5 AB, 77.5 AB

[56] References Cited

U.S. PATENT DOCUMENTS

| | | | |
|---|---|---|---|
| 3,332,887 | 6/1967 | Endler | 252/430 X |
| 3,515,700 | 6/1970 | Yokouchi et al. | 252/430 X |
| 3,776,862 | 12/1973 | Boor | 252/430 X |
| 3,884,849 | 5/1975 | Molbert | 260/2.5 AB |

*Primary Examiner*—Leland A. Sebastian
*Attorney, Agent, or Firm*—Joseph E. Rusz; William J. O'Brien

[57] ABSTRACT

A catalyst system for promoting the room temperature of isocyatic cured polyurethane based propellants. The system is composed of a metal catalyst; a chelating agent or an acid as a suppressor component; and zinc oxide as a scavenger component. The suppressor inactivates the catalyst, thus providing the necessary potlife, while the scavenger slowly consumes the suppressor, thus restoring the activity of the catalyst, which then promotes an effective cure.

4 Claims, No Drawings

CATALYST SYSTEM FOR POLYURETHANE PROPELLANT COMPOSITIONS

STATEMENT OF GOVERNMENT INTEREST

The invention described herein may be manufactured and used by or for the Government for governmental purposes without the payment of any royalty thereon.

BACKGROUND OF THE INVENTION

This invention relates to solid propellant compositions and to a method for their cure. More particularly, this invention concerns itself with an improved catalyst system for curing polyurethane propellant compositions.

In general, solid propellant compositions are composed of a mixture of an inorganic oxidizer disposed in a matrix of plastic resinous or elastomeric material. The matrix provides fuel for the combustion reaction and, in some propellants, acts as a binder for holding the propellant mixture together prior to combustion. Amongst the preferred binder materials are the polyurethanes which have proven to be an excellent fuel and binder component for modern propellants.

The Urethane based propellants are conventionally cured at temperatures of from about 110°–1135° F. The use of these high temperatures, however, often creates problems of stress and strain in case bonded solid rocket motors. A reduction of the cure temperature to 70°–80° F would significantly reduce propellant bore strains and bond stresses in case bonded solid rocket motors. The lower cure temperature could also result in better propellant mechanical behavior, because side reactions are also minimized at lower temperatures.

As a consequence of the problems created by high temperature curing, a considerable research effort has evolved in an attempt to develop catalysts which promote the isocyanate-hydroxy reaction at room temperature under the conditions expected in a solid propellant environment. Also, the catalysts have to achieve their effectiveness without seriously affecting propellant processing characteristics, mechanical behavior and storage stability.

One catalyst which has been suggested for use in curing polyurethane propellant is Ferric acetylacetonate, otherwise designated as $Fe(AA)_3$. However, a satisfactory balance between potlife and the time required for full cure is a major problem with such catalysts since the accelerating effect of a higher curing temperature on the urethane reaction cannot be utilized. This is particularly true for a lithium initiated, hydroxy terminated polybutadiene prepolymer cured with a diisocyanate, such as hexamethylene diisocyanate, since both NCO groups of which possess equal reactivity.

At catalyst levels as low as 0.001% $Fe(AA)_3$ the propellant mix will be castable for only 30 minutes in case of hexamethylene diisocyanate and somewhat longer for toluene diisocyanate cured propellants but still requires 7–10 days for full cure. In the absence of catalyst Li HTPB propellants are practically uncurable (weeks at 180° F are required). Reduction of the catalyst level below 0.001% entails the danger of losing the catalyst in degradative reactions.

With the present invention, however, it has been found that $Fe(AA)_3$ can be effectively utilized as a catalyst for the low temperature cure of polyurethane based propellants, provided it is employed in a system along with a suppressor material and a scavenger material. Such a catalyst system has proven to be highly effective in solving the problems encountered in the curing of polyurethane binders and propellants. The suppressor material can be either a diketone or an acid while zinc oxide has been found to be a most efficient scavenger component.

SUMMARY OF THE INVENTION

In accordance with the general concept of this invention, there is provided a catalyst system which strikes a satisfactory balance between potlife, and the time required for a full cure in the cure catalysis of polyurethane based propellants. The catalyst system comprises the catalyst proper $Fe(AA)_3$, a suppressor component which can be acetylacetone and or a α-hydroxy acid which temporarily inactivates the catalyst, and a zinc oxide scavenger which slowly consumes the suppressor thus reactivating the catalyst.

Accordingly, the primary object of this invention is to provide a novel catalyst system for curing polyurethane based propellants.

Another object of this invention is to provide a propellant catalyst that does not adversely affect the aging, mechanical properties and the processing procedure for polyurethane propellants.

Still another object of this invention is to provide a catalyst system for polyurethane propellants that achieves a satisfaction, balance between potlife and the time required for a full cure.

The above and still other objects and advantages of the present invention will become more readily apparent to those skilled in the art upon consideration of the following detailed description thereof.

DESCRIPTION OF THE PREFERRED EMBODIMENTS

Pursuant to the above-defined objects, this invention contemplates a catalyst system for curing a propellant composition which uses a polyurethane, such as a lithium initiated hydroxy-terminated polybutadiene, as a fuel and binder component for the propellant. The key problem in the cure of hydroxy-terminated polybutadiene propellents is the achievement of adequate potlife in the presence of a catalyst, which will effect complete cure in a reasonable time. With a simple catalyst, it is not possible to achieve this objective.

A good catalyst accelerates essentially the urethane reaction, i.e., the cure reaction proper, leaving side reactions like the water-isocyanate reaction comparatively unaffected. At higher levels of catalyst, therefore, the effects of side reactions are minimized and the overall state of cure and hence reproducibility as well as mechanical properties are improved.

The level of contaminants (moisture, etc.) in propellants may vary, depending on exposure to the environment and the characteristics of the propellant components which may not be known with the desired precision. While some of the contaminants may be neutralized by suitable scavengers, it is obviously good practice to minimize the cure time during which these substances can interfere with the urethane reaction. This cure time, unfortunately, must include a lengthy period, referred to as potlife (usually about 8 hours are required) during which the propellant batch must remain liquid in order to be cast into motor chambers. During this time, the propellant viscosity at all shear levels should not rise above 50,000 poise, to assure flaw-free castings.

HTPB prepolymers have about the highest reactivity of any hydroxyl containing compound. Thus, in order to obtain the desired potlife, the slower reacting isocyanates such as TDI, HDI, IPDI, (toluene diisocyanate, hexanedi-isocyanate, isophorone diisocyanate), etc. must be used. Aromatic isocyanates with unhindered NCO groups, or even more so, electronegatively substituted isocyanates, such as tetrafluoro-1,4-phenylene diisocyanate, are too fast, even uncatalyzed, to be applicable.

Even less reactive isocyanates, require low concentrations of the more effective catalysts or the propellant potlife is undesirably short. Slightly higher concentrations of moderately active catalysts which are best in promoting the urethane reaction are also the most active ones so that only very small catalyst concentrations are permissible. This poses an additional problem in that at low concentrations, the catalyst can be completely lost by hydrolysis or other degradative reactions. One method which has been quite successful was the modification (weakening) of catalyst activity by the simultaneous addition of a chelating agent, usually the same that is contained in the metal chelate catalyst, e.g. the combination ferric acetylacetonate-pentanedione, Fe(AA)$_3$—HAA. With this modification, the catalyst concentration can be increased to safe levels and, moreover, the free chelating agent acts as a stabilizer or suppressor for the catalyst further reducing the danger of loss by degradative reactions.

While the Fe(AA)$_3$—HAA method has worked satisfactorily in many applications, the over-all required cure times are long and give contaminants too much of an opportunity to interfere in the curing reaction. The addition of a scavenger, however, slowly neutralizes the suppressor and thus restores the activity of the catalyst. This shortens the overall time required for cure and, therefore, gives contaminants less time to interfere. The effect of several chelating agents on catalyst activity is shown in Table I.

TABLE I
EFFECT OF CHELATING AGENTS AS SUPPRESSORS ON RELATIVE RATE OF THE CATALYZED METHANOL-HDI REACTION AT 25° C

| Catalyst | Catalyst Concentration 0.2% | |
|---|---|---|
| | Chelating Agent, % | Relative Rate |
| Fe(AA)$_3$ | None | 1 |
| | HAA, 0.01 | 0.50 |
| | HAA, 0.025 | 0.25 |
| | HAA, 0.050 | 0.19 |
| | HAA, 0.100 | 0.065 |
| | HO$_2$AA, 0.05 | 0.35 |
| | HO$_2$AA, 0.1 | 0.19 |
| | HO$_2$AA, 0.2 | 0.11 |
| | HO$_2$AA, 0.4 | 0.04 |
| | HAA, 0.1 | 0.065 |
| | HO$_2$AA, 0.1 | 0.19 |
| | HF$_3$AA, 0.1 | 0.06 |
| | HF$_6$AA, 0.1 | 0.05 |
| | HDAc, 0.1 | 0.11 |
| | HTAM, 0.1 | 0.24 |
| | HBAA, 0.1 | 0.12 |
| Fe(ClO$_4$)$_3$ | None | 1.0 |
| | HAA, 0.01 | 0.71 |
| | HAA, 0.025 | 0.40 |
| | HAA, 0.05 | 0.36 |
| Zn(AA)$_2$ | None | 1.0 |
| | HAA, 0.01 | 0.30 |
| | HAA, 0.025 | 0.14 |
| | HAA, 0.050 | 0.09 |
| | HAA, 0.10 | 0.04 |
| T-12 | None | 1.0 |
| | HAA, 0.10 | 0.68 |
| | HAA, 0.40 | 0.29 |
| | HAA, 1.00 | 0.13 |

Legend:
HAA = 2,4pentanedione
HDA$_c$ = Dehydracetic acid
HO$_2$AA = Dilenzoylmethane
HTAM = Triacetylmethane
HF$_3$AA = Trifluoroacetylacetone
HBAA = 3-Benzoylacetylacetone
HF$_6$AA = Hexafluoroacetylacetone
T-12 = Dibutyltin dilaurate The addition of a scavenger component, such as zinc oxide, does not noticeably affect the viscosity build-up during the initial stages of the curing reaction and accordingly, do not shorten pot-life. The use of zinc oxide, as shown in Table II, does substantially shorten the time of cure.

It should be noted that the propellant not containing the suppressor had a useful potlife of less than 1 hour, Instead of diketones, acids can be used as suppressors because according to the equilibrium: M(AA)$_3$+HX ⇌ M(AA)$_2$+HAA the diketone is liberated, which then acts as the actual suppressor. Because of the higher reactivity of the acids, they can be more readily neutralized by proper scavengers. Thus, the metal chelate-acid-scavenger system is particularly useful if cure is to be effected at ambient temperatures, while the β-diketone is better suited for cure at elevated temperatures, where acids may not yield the required potlife.

TABLE II
MECHANICAL PROPERTIES OF HTPB PROPELLANTS CURED AT ROOM TEMPERATURE (85% Wt% Solids)

| Catalyst Combination, % | | | | Shore Hardness After Days Cure | | | Mechanical Properties at 77° F | | |
|---|---|---|---|---|---|---|---|---|---|
| Fe (AA)$_3$ | HAA | ZnO | Ni(en)$_3$Cl$_2$ | 2 | 3 | 5 | $c_m$ psi | m % | $E_o$ psi |
| 0.001 | 0.01 | 0.1 | — | 35 | 43 | 45 | 127 | 35 | 506 |
| 0.001 | 0.01 | — | 0.1 | 20 | 35 | 40 | 125 | 37 | 470 |
| 0.001 | 0.01 | — | — | 4 | 15 | 25 | 92 | 41 | 235 |
| 0.001 | — | — | — | 40 | 40 | 40 | 117 | 37 | 410 |
| — | — | — | — | 4 | — | 15 | 65 | 47 | 135 |

Table III shows the modification of catalyst activity by acids, and Tables IV and V, some typical data on viscosity build-up of such systems. Acids can be used in conjunction with metal salts, where the β-diketones are comparatively ineffective suppressors. For example, the catalytic activity of dibutyltindilaurate can be controlled by acids much more effectively than than with a diketone as shown in Table VI. In general, all acids which have a pKa of 6 or lower will yield a satisfactory potlife. The acids tested include acetic, chloroacetic, -chlorooctanoic, α-bromotetradecanoic, linoleic, mandelic (phenylhydroxyacetic), benzilic (diphenylhydroxyacetic), lactic, pyruvic, phenylacetic, p-nitrophenylacetic and p-toluenesulfonic acid. Of these, the best appear to be the α-hydroxyacids, mandelic and benzilic acids.

TABLE III
EFFECT ON ACIDS ON THE RATE OF THE Fe (AA) CATALYZED METHANOL-HDI REACTION AT 25° C[3]
(Concentration Fe (AA)$_3$ 2.6·× 10$^{-3}$ M)

| Acid | Concentration M × 10$^3$ | Relative Rate |
|---|---|---|
| None | — | 1 |
| Acetylacetone | 10 | 0.12 |
| Perchloric | 4 | 0.19 |
| " | 10 | 0.08 |
| Nitric | 4 | 0.15 |
| " | 10 | 0.10 |
| Hydrochloric | 4 | 0.16 |
| " | 10 | 0.10 |
| p-Toluenesulfonic | 4 | 0.21 |
| " | 10 | 0.10 |
| Benzilic | 4 | 0.12 |
| " | 10 | 0.07 |
| Citric | 10 | 0.09 |
| -Chloroacetic | 10 | 0.22 |
| Acetic | 10 | 0.65 |
| Linoleic | 10 | 0.58 |
| -Chlorooctanoic | 10 | 0.30 |
| -Bromotetradecanoic | 10 | 0.25 |

TABLE IV
EFFECT OF ACIDS ON THE POTLIFE OF 85 WT% SOLID PROPELLANTS (primary Terminated HTPB) Infinite Shear Viscosity (poise) at 77° F

| No. 1 | | No. 2 | | No. 3 | | No. 4 | |
|---|---|---|---|---|---|---|---|
| Hrs | Poises | Hrs | Poises | Hrs | Poises | Hrs | Poises |
| 1 | 58,300 | 1.3 | 11,000 | 1.7 | 244,000 | 2 | 67,000 |
| 3 | 445,000 | 3.2 | 53,000 | 3.8 | 824,000 | 4 | 153,000 |
| | | 5.2 | 130,000 | | | 6 | 470,000 |
| | | 7.2 | 360,000 | | | | |

| No. | Catalyst System | Mechanical Properties[b] at 77° F after 20 days Cure at Ambient Temp. | | |
|---|---|---|---|---|
| | | $c_m$, psi | $m$, % | $E_o$, psi |
| 1 | Fe (AA)$_3$ 0.0025%, ZnO 0.1%, chloroacetic acid 0.5[a] | 159 | 44 | 730 |
| 2 | Fe (AA)$_3$ 0.0025%, ZnO 0.1%, benzilic 3 acid 0.25 | 156 | 86 | 630 |
| 3 | Fe (AA)$_3$ 0.0025%, ZnO 0.1%, linoleic acid 0.5 | 138 | 76 | 470 |
| 4 | Fe (AA)$_3$ 0.0025%, ZnO 0.1% HAA 0.1 | 108 | 75 | 545 |

[a]Acid concentrations in mmoles/400g propellant
[b]Standard JANNAF tensile specimens, 0.74 min$^{-1}$

TABLE V
POTLIFE AND PROPERTIES OF 85 WT% PROPELLANTS

| | Infinite Shear Viscosity at 77° F | | | | | |
|---|---|---|---|---|---|---|
| No. 1 | | No. 2 | | No. 3 | | |
| Hours | Poise | Hours | Poise | Hours | Poise | |
| 1 | 10,000 | 1.3 | 7,000 | 1.2 | 9,000 | |
| 3 | 23,000 | 3.2 | 12,000 | 3.2 | 17,000 | |
| 5 | 60,000 | 5.2 | 21,000 | 5.2 | 33,000 | |
| 7 | 138,000 | 7.2 | 42,000 | 7.2 | 62,000 | |
| 9 | 263,000 | 9.2 | 74,000 | 9.2 | 98,000 | |
| | | 11.2 | 168,000 | 11.2 | 148,000 | |
| | | 13.2 | 259,000 | | | |

| No. | Catalyst System |
|---|---|
| 1 | 0.0025% F$^E$AA, .05 HAA[b], 0.025 benzilic acid, 1.01% ZnO |
| 2 | 0.0025% FeAA, .05 HAA[b], 0.025 benzilic acid, 0.1% ZnO[c] |
| 3 | 0.0025% T-12, 0.025% para-toluene sulfonic acid |

[a]Standard JANNAF tensile specimens, 0.74 min$^{-1}$
[b]Concentration of HAA and acid in mmoles/400g propellant
[c]Propellant contained diethanolamine 0.025% instead of TEPAN

TABLE VI
EFFECT OF ACIDS AND HAA ON THE RATE OF DIBUTYLTIN DILAURATE CATALYZED 1-BUTANOL-HDI REACTION AT 25° C
(Catalyst Concentration 4.2 × 10$^{-3}$ M)

| Additive | Concentration M × 10$^3$ | Relative Rate |
|---|---|---|
| None | — | 1.0 |
| Linoleic Acid | 20 | 0.65 |
| p-Toluenesulfonic Acid | 10 | 0.10 |
| Acetylacetone | 200 | 0.07 |

It is of course also possible to use the acid suppressor in combination with a diketone, in this fashion minimizing any possible undesirable side effects of either component. For example, if the required potlife is to be achieved only by a diketone, the time to achieve full cure will be unduly long, while large concentrations of acids are required if satisfactory potlife should result. The latter increases the danger of undesirable side reactions, i.e., noticeable consumption of NCO-groups by the acid.

Table VII illustrates the effect of the zinc-oxide scavenger on a number of acid suppressors and mixed acetylacetone-acid suppressors used in HTPB propellants. It is readily seen that the propellants containing the suppressor reach a harder state of cure, caused by a more complete reaction of hydroxyl and NCO groups, than the corresponding propellants without the scavenger.

TABLE VII
EFFECTS OF ACIDS AND HAA AS CATALYST SUPPRESSORS IN 85 WT% SOLIDS PROPELLANTS (Primary Terminated HTPB Lots 242 AM-310 and 831AM-112A)

| Number | Suppressor-Scavenger[a] | Prepolymer Lot | $m$, psi | $m$, % | $E_o$, psi |
|---|---|---|---|---|---|
| 1 | Chloracetic Acid 0.4[c] | 242AM-310 | 137 | 53 | 613 |
| 2 | Chloroacetic Acid 0.4, ZnO 0.1% | 242AM-310 | 148 | 45 | 655 |
| 3 | Benzilic Acid 0.2 | 242AM-310 | 93 | 99 | 350 |
| 4 | Benzilic Acid 0.2, ZnO, 0.1% | 242AM-310 | 137 | 67 | 560 |
| 5 | Linoleic Acid 0.5, ZnO 0.1%[d] | 242AM-310 | 105 | 69 | 383 |
| 6 | Linoleic Acid 0.5, ZnO 0.1%[c] | 831AM-112A | 100 | 48 | 255 |
| 7 | Linoleic Acid 0.5, PbO 0.1%[c] | 831AM-112A | 128 | 42 | 374 |
| 8 | Acetylacetone 0.1, - | 831AM-112A | 117 | 33 | 410 |
| 9 | HAA 0.1, Linoleic 0.5, ZnO 0.1%[c] | 242AM-310 | 92 | 86 | 365 |
| 10 | HAA 0.1, Linoleic 0.5, - | 242AM-310 | 71 | 97 | 286 |
| 11 | HAA 0.1, Benzilic 0.25, ZnO 0.1% | 242AM-310 | 90 | 89 | 310 |
| 12 | HAA 0.1, Chloroacetic 0.5, ZnO 0.1% | 242AM-310 | 120 | 63 | 479 |
| 13 | HAA 0.2, AnO 0.1% | 242AM-310 | 72 | 97 | 281 |

[a]All contain 0.0025% Fe(AA)$_3$, suppressor concentration is given in mmoles/lb propellant
[b]Standard JANNAF Tensile Specimens, 0.74$^{-1}$.
[c]6 Days ambient cure
[d]4 Days ambient cure USING THE HAA-ACID SUPPRESSOR COMBINATION (Primary Terminated HTPB)

In Table VIII, the catalyst-acid-ZnO system is shown for the case of the tin catalyst (dibutyltindilaurate) for which previously there was no known way of tailoring catalyst activity. Again, it should be noted that in the absence of the suppressor, the useful potlife was less than 1 hour. Tables IX, X and XI present more examples where satisfactory potlife followed by good cure has been obtained through the use of the catalyst-suppressor-scavenger combination.

TABLE VIII
MODIFICATION OF DIBUTYLTIN DILAURATE CATALYZED BY ACIDS 85 Wt% Solids, Lot 242AM-310[b]

| | Rex Hardness | | | Mechanical Properties at 77° F[a] 14 Days Ambient Cure | | |
|---|---|---|---|---|---|---|
| Catalyst System | 1 day | 2 days | 5 days | m, psi | m, % | $E_o$, psi |
| 0.0025% T-12 | 70 | 70 | 70 | 157 | 40 | 750 |
| 0.0025% T-12, 0.25 PTS[c], 0.1% ZnO | 10 | 35 | 55 | 107 | 73 | 437 |
| 0.0025% T-12, 0.25 linoleic acid, 0.1% ZnO | 10 | 35 | 55 | 100 | 94 | 363 |

[a]Standard JANNAF tensile specimens, 0.74 min$^{-1}$
[b]Curative is HDI
[c]Paratoluene sulfonic acid.

TABLE IX
TEST OF ACID SUPPRESSORS IN 85 WT% SOLID PROPELLANTS (242AM310 HTPB Prepolymer)

| | Uniaxial Tensile Properties 77° F[a] 12 Days - Ambient Cure | | |
|---|---|---|---|
| Catalyst 0.0025% Fe (AA)$_3$, 0.1% ZnO 0.25 moles Acid Suppressor | m, psi | m, % | $E_o$, psi |
| Phenylacetic acid | 150 | 49 | 631 |
| p-Nitrophenylacetic acid | 135 | 39 | 682 |
| Mandelic acid | 93 | 38 | 488 |
| Lactic acid | 119 | 62 | 506 |

[a]Standard JANNAF tensile specimen, 0.74 min$^{-1}$

TABLE X
PROPERTIES OF 10-LB PROPELLANT BATCHES (88% SOLIDS) USING VARIOUS MODIFICATIONS AND THE PRIMARY HTPB LOT 242AM-310

| | | | Uniaxial Tensile Properties at 77° F[a] | | | | | | | | |
|---|---|---|---|---|---|---|---|---|---|---|---|
| | | | 14 day ambient | | | 30 day ambient | | | 14 day 160° F | | |
| No. | Curative | Suppressor[b] mmoles/400g | m psi | m % | $E_o$ psi | m psi | m % | $E_o$ psi | m psi | m % | $E_o$ psi |
| 1 | PAPI/HDI/TDI | Benzilic Acid 0.33 | 70 | 58 | 290 | 96 | 50 | 340 | 103 | 65 | 314 |
| 2 | CTI/TDI | Benzilic Acid 0.33 | 132 | 52 | 440 | 164 | 43 | 600 | 180 | 49 | 620 |
| 3 | HDI | Mandelic Acid[c] 0.25 | 124 | 49 | 540 | 149 | 45 | 690 | 157 | 52 | 680 |
| 4 | HDI | p-Nitrophenyl-acetic Acid[d] 0.25 | 139 | 43 | 700 | 147 | 46 | 800 | 169 | 51 | 640 |

[a]Standard JANNAF tensile specimens; 0.74 min$^{-1}$.
[b]Catalyst system: 0.008% Fe (AA)$_3$, 0.004% HAA and 0.1% ZnO.
[c]Catalyst system: 0.004% Fe (AA)$_3$, 0.004% HAA and 0.1% ZnO.
[d]Catalyst system: 0.004% dibutyltin dilaurate, 0.1% ZnO.

TABLE XI
ACID SUPPRESSORS USED WITH TDI IN PRIMARY HTPB PROPELLANTS (LOT 242AM-310); 88 WEIGHT % SOLIDS

| | | Uniaxial Tensile Properties at 77° F[b] | | | | | | | | |
|---|---|---|---|---|---|---|---|---|---|---|
| | | 10 day Amb. Cure | | | 30 day Amb. Cure | | | 14 day 160° F Aging | | |
| No. | Suppressor[a], mmoles/400g | m psi | m % | $E_o$ psi | m psi | m % | $E_o$ psi | o psi | m % | $E_o$ psi |
| 1 | None | 50 | 51 | 210 | 208 | 40 | 880 | 235 | 47 | 970 |
| 2 | 0.33 benzilic acid | 69 | 56 | 380 | 162 | 55 | 630 | 161 | 54 | 550 |
| 3 | 0.33 p-toluene-sulfonic acid | 99 | 54 | 410 | 199 | 51 | 780 | 180 | 53 | 650 |
| 4 | 0.33 pyruvic acid | 56 | 51 | 280 | 189 | 48 | 750 | 191 | 47 | 800 |

[a]Catalyst system contained in addition: 0.008% Fe(AA)$_3$, 0.004% HAA and 0.1% ZnO.
[b]Standard JANNAF tensile specimens; 0.74 min$^{-1}$.

Although the invention has been described by reference to particular embodiments thereof, it is to be understood by those skilled in the art that all the various modifications and alterations that are encompassed within the scope of the appended claims are intended to be included herein.

What is claimed is:

1. A catalyst system for promoting the iscoyanate-hydroxy curing reaction of polyurethane based propellant compositions which comprises a mixture of (a) ferric acetylacetonate as a catalyst proper; (b) a suppressor component for suppressing the catalytic activity of said catalyst proper; and (c) a scavenger component composed of zinc oxide for increasing the rate of consumption of the said suppressor component.

2. A catalyst system in accordance with claim 1 wherein said suppressor component is selected from the group consisting of diketones and organic acids having a pKa no greater than 6 and mixtures thereof.

3. A catalyst system in accordance with claim 2 wherein said suppressor is acetylacetone.

4. A catalyst system in accordance with claim 2 wherein said suppressor is an organic acid selected from the group consisting of chloroacetic, acetic, α-chloroacetanoic, α-bromotetradecanoic, linoleic, mandelic, benzilic, lactic, pyruvic, phenylacetic, p-nitrophenylacetic and p-toluenesulfonic.

* * * * *